No. 683,379. Patented Sept. 24, 1901.
H. W. BYRON.
COMPUTING APPARATUS.
(Application filed May 12, 1900.)
(No Model.)

WITNESSES:
M. D. Bloudel.
Perry B. Turpin.

INVENTOR
H. W. Byron.
BY Munn & Co.
ATTORNEYS

UNITED STATES PATENT OFFICE.

HAROLD W. BYRON, OF WILLIAMSPORT, MARYLAND.

COMPUTING APPARATUS.

SPECIFICATION forming part of Letters Patent No. 683,379, dated September 24, 1901.

Application filed May 12, 1900. Serial No. 16,501. (No model.)

*To all whom it may concern:*

Be it known that I, HAROLD W. BYRON, residing at Williamsport, in the county of Washington and State of Maryland, have invented a new and Improved Computing Apparatus, of which the following is a specification.

My invention is an improvement in computing apparatus, and especially in that class of such apparatus represented by my former patent, No. 584,458, dated June 15, 1897; and the present invention has for an object to provide improvements in the spreading devices, which indicate the weight per square foot of a sheet of leather or similar material.

In the present invention I seek to construct the spreading devices in such manner that they spread or open and close in a longitudinal direction; and the invention consists in certain novel constructions and combinations of parts, as will be hereinafter described and claimed.

Figure 1:
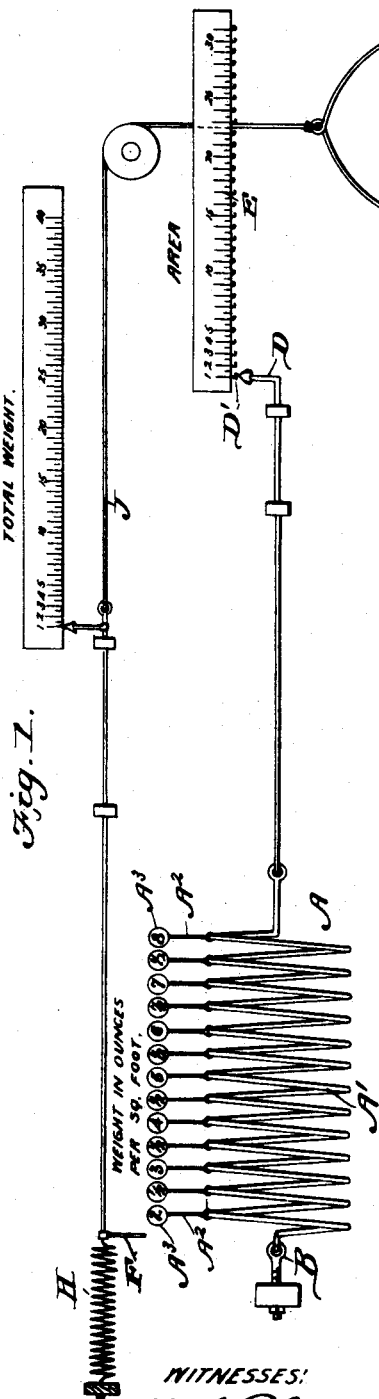
Figure 2:
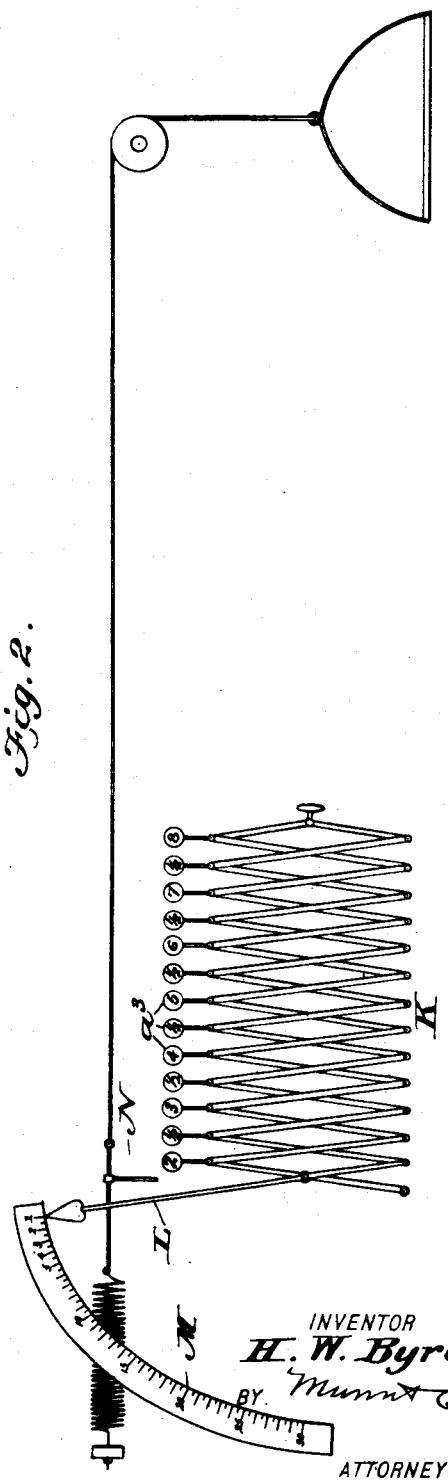

In the drawings, Figure 1 is a side elevation of an apparatus embodying my invention, and Fig. 2 is a side elevation of a somewhat different construction within the broad principles of the invention.

In my former patent, before referred to, the spreading fingers are opened correspondingly with the area of the sheet of leather whose weight is to be computed per square foot, and the said fingers open and close fan fashion, as will more fully appear on reference to the said patent.

In my present invention, as illustrated in Fig. 1, I construct the spreading device in the form of a helical spring A, whose coils A' adjust apart as the device is spread by expanding the spring longitudinally, and on these coils I provide the pointers $A^2$, which preferably bear a disk $A^3$ or other suitable means for receiving a distinguishing-mark. The disks may be numbered "2," "2½," "3," &c., up to "8," as the weight per foot of leather usually ranges between two and eight ounces. The spring A may be suitably secured at one end B, and has connected with its other end an indicator D, which registers along a graduation E, which may be marked to indicate the area of the sheet of leather. In operation the indicator D may be adjusted along the scale E to the proper point and secured in such position by means of a hook D' or other suitable device. This will spread the spreading device to an extent corresponding with the area of the leather to be computed. If now a total-weight indicator F be adjusted along the longitudinally-extensible spreading device to a point corresponding with the total weight of the leather, the pointer $A^2$, with which the total-weight indicator F most closely registers, will indicate the weight in ounces per square foot of the leather. The weight-indicator F may be set by hand to a point corresponding with the predetermined total weight of the leather sheet, or such setting may be accomplished automatically by providing a weighing-scale including a spring H, a scale-platform I, and a connection J between the two, such connection extending alongside the coils A' adjacent to the disks $A^3$ and bearing the indicator F, so such indicator will register along the disks $A^3$, as shown in Fig. 1.

In Fig. 2 I show a somewhat different construction, in which the disks $a^3$, which suggest the weight per square foot of the leather, are supported on the jointed sections of a lazy-tongs K, one arm L of which registers along a graduation M, corresponding to the area of the sheet of leather, and the pointer N, corresponding to the total weight of the leather sheet, being movable along the lazy-tongs to register with the disks $a^3$, as shown. In this construction it will be noticed the spreading device is spread longitudinally, corresponding to the area of the leather sheet, and the indicator which corresponds to the total weight of the leather sheet is adjusted along the longitudinally-movable spreading device.

The construction of the spreading device to expand or open and close longitudinally is a simple, economical, and easily-operated feature of the present invention.

Having thus described my invention, what I claim, and desire to secure by Letters Patent, is—

1. The combination in a computing apparatus of a longitudinally-expansible spreading device having a series of sections, and a total-weight indicator movable along the said device and registering with the sections thereof substantially as set forth.

2. The combination in a computing apparatus of a longitudinally-expansible spreading device having a series of sections and indicators thereon, a total-weight indicator movable along said spreading device and registering with the indicators thereof, and an area-indicator relative to which the sections of the spreading devices are adjusted substantially as set forth.

3. In a computing apparatus, a longitudinally-expansible spreading device having sections which adjust together and apart and an indicator movable along said device in position to register with the sections thereof, substantially as set forth.

4. A computing apparatus comprising a longitudinally-expansible spreading device having sections movable together and apart, and a weighing-scale having an indicator movable along said spreading device and registering with the sections thereof, substantially as set forth.

5. In a computing apparatus a spreading device composed of a helical spring having its coils provided with indicating means, and an indicator movable along said spring and arranged to register with the indicating means on the coils thereof, substantially as set forth.

HAROLD W. BYRON.

Witnesses:
C. R. McKinstry,
R. B. Ritchey.